United States Patent
Rijsman et al.

(10) Patent No.: US 12,294,517 B2
(45) Date of Patent: *May 6, 2025

(54) REMOTELY UPDATING ROUTING TABLES

(71) Applicant: Juniper Networks, Inc., Sunnyvale, CA (US)

(72) Inventors: Bruno Rijsman, Arlington, MA (US); Usha Sharma, Fremont, CA (US); Prabhakaran Ganesan, Fremont, CA (US); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/193,481

(22) Filed: Nov. 16, 2018

(65) Prior Publication Data

US 2019/0089631 A1    Mar. 21, 2019

Related U.S. Application Data

(63) Continuation of application No. 13/955,945, filed on Jul. 31, 2013, now Pat. No. 10,135,732, which is a (Continued)

(51) Int. Cl.
*G06F 15/16* (2006.01)
*H04L 45/00* (2022.01)
(Continued)

(52) U.S. Cl.
CPC ............ *H04L 45/745* (2013.01); *H04L 45/02* (2013.01); *H04L 45/302* (2013.01);
(Continued)

(58) Field of Classification Search
CPC ..... H04L 45/745; H04L 45/02; H04L 45/302; H04L 45/306; H04L 45/38; H04L 45/42; H04L 45/75
See application file for complete search history.

(56) References Cited

U.S. PATENT DOCUMENTS 6,539,026 B1   3/2003 Waclawsky
6,651,067 B1   11/2003 Gorelik et al.
(Continued)

FOREIGN PATENT DOCUMENTS

CN    1507734 A    6/2004
CN    102055667 A    5/2011
(Continued)

OTHER PUBLICATIONS

Tilman Wolf: 11 In-network services for customization in next-generation networks 11, IEEE Network, IEEE Service Center, New York, NY, US, vol. 24, No. 4, Jul. 1, 2010 (Jul. 1, 2010), pp. 6-12.
(Continued)

*Primary Examiner* — Dhairya A Patel
(74) *Attorney, Agent, or Firm* — Harrity & Harrity, LLP

(57) ABSTRACT

A network device may receive an instruction to update a data structure implemented by the network device and update the data structure based on receiving the instruction. The data structure may include a routing instruction to direct the network device to provide a data flow to a server device for processing. The network device may receive the data flow destined for a destination device; determine the routing instruction based on at least a portion of an internet protocol (IP) address associated with the data flow and based on the data structure; execute the routing instruction to provide the data flow to the server device and to cause the data flow to be processed by the server device to form a processed data flow; and receive the processed data flow and provide the processed data flow towards the destination device.

20 Claims, 8 Drawing Sheets

Related U.S. Application Data continuation-in-part of application No. 13/740,781, filed on Jan. 14, 2013, now Pat. No. 8,954,535.

(60) Provisional application No. 61/747,930, filed on Dec. 31, 2012.

(51) Int. Cl.
*H04L 45/02* (2022.01)
*H04L 45/302* (2022.01)
*H04L 45/42* (2022.01)
*H04L 45/745* (2022.01)

(52) U.S. Cl.
CPC ............ *H04L 45/306* (2013.01); *H04L 45/38* (2013.01); *H04L 45/42* (2013.01)

(56) References Cited

U.S. PATENT DOCUMENTS

| | | | |
|---|---|---|---|
| 6,651,142 B1 | 11/2003 | Gorelik et al. | |
| 6,836,462 B1 | 12/2004 | Albert | |
| 6,836,463 B2 | 12/2004 | Garcia-Luna-Aceves | |
| 6,856,991 B1 | 2/2005 | Srivastava | |
| 7,035,202 B2 | 4/2006 | Callon | |
| 7,047,315 B1 | 5/2006 | Srivastava | |
| 7,363,353 B2 | 4/2008 | Ganesan | |
| 7,529,563 B1 | 5/2009 | Pitroda | |
| 7,551,303 B2 | 6/2009 | Hikawa et al. | |
| 7,653,075 B2 * | 1/2010 | Singh | H04L 12/4633 370/395.42 |
| 7,668,541 B2 * | 2/2010 | O'Neill | H04W 36/0033 455/433 |
| 7,735,139 B1 | 6/2010 | Chou | |
| 7,742,406 B1 | 6/2010 | Muppala | |
| 7,813,352 B2 | 10/2010 | Riddle et al. | |
| 7,826,372 B1 * | 11/2010 | Mabe | H04L 45/122 370/255 |
| 7,843,843 B1 | 11/2010 | Papp et al. | |
| 7,881,215 B1 | 2/2011 | Daigle et al. | |
| 8,018,943 B1 | 9/2011 | Pleshek | |
| 8,042,041 B1 | 10/2011 | Fenn et al. | |
| 8,180,870 B1 | 5/2012 | McDysan | |
| 8,300,578 B2 | 10/2012 | Patil | |
| 8,442,048 B2 | 5/2013 | Aybay et al. | |
| 8,804,747 B2 | 8/2014 | Galles et al. | |
| 8,886,180 B2 * | 11/2014 | O'Neill | H04L 45/02 455/433 |
| 8,934,495 B1 | 1/2015 | Hilton | |
| 8,954,535 B2 | 2/2015 | Rijsman et al. | |
| 9,055,023 B2 | 6/2015 | Murphy et al. | |
| 9,210,066 B2 | 12/2015 | Liu | |
| 9,258,384 B2 | 2/2016 | Rijsman et al. | |
| 9,596,189 B1 * | 3/2017 | Lea | G06F 9/45558 |
| 9,621,516 B2 | 4/2017 | Basak | |
| 10,135,732 B2 | 11/2018 | Rijsman et al. | |
| 2003/0110236 A1 | 6/2003 | Yang | |
| 2004/0085968 A1 | 5/2004 | Chen | |
| 2004/0218548 A1 | 11/2004 | Kennedy | |
| 2005/0010925 A1 | 1/2005 | Khawand | |
| 2005/0147062 A1 | 7/2005 | Khouaja | |
| 2005/0193114 A1 | 9/2005 | Colby et al. | |
| 2005/0276262 A1 | 12/2005 | Schuba | |
| 2006/0002319 A1 | 1/2006 | Lee et al. | |
| 2006/0288418 A1 | 12/2006 | Yang | |
| 2007/0162614 A1 | 7/2007 | Patel | |
| 2007/0174583 A1 * | 7/2007 | Shinkai | G06F 3/0605 711/203 |
| 2007/0208874 A1 | 9/2007 | Previdi | |
| 2008/0008183 A1 * | 1/2008 | Takagaki | H04L 47/2416 370/392 |
| 2008/0114892 A1 | 5/2008 | Bruno | |
| 2008/0137615 A1 | 6/2008 | Park | |
| 2008/0192677 A1 | 8/2008 | Abusch-Magder | |
| 2008/0228932 A1 | 9/2008 | Monette | |
| 2009/0037999 A1 * | 2/2009 | Anderson | H04W 28/16 726/12 |
| 2009/0131053 A1 | 5/2009 | Sachs | |
| 2009/0182874 A1 | 7/2009 | Morford et al. | |
| 2009/0207738 A1 * | 8/2009 | Denis-Courmont | H04L 47/70 370/238 |
| 2010/0008228 A1 | 1/2010 | Chakravorty | |
| 2010/0135306 A1 | 6/2010 | Lee | |
| 2010/0158004 A1 * | 6/2010 | Tarkoma | H04L 47/125 370/392 |
| 2010/0235877 A1 | 9/2010 | Hu et al. | |
| 2010/0287262 A1 * | 11/2010 | Elzur | H04L 45/302 709/220 |
| 2010/0315950 A1 | 12/2010 | Venkataraman et al. | |
| 2010/0333165 A1 | 12/2010 | Basak | |
| 2011/0019614 A1 * | 1/2011 | O'Neill | H04W 36/0033 370/328 |
| 2011/0087774 A1 | 4/2011 | Pope | |
| 2012/0007743 A1 | 1/2012 | Solomon | |
| 2012/0033555 A1 | 2/2012 | Liu | |
| 2012/0079092 A1 | 3/2012 | Woxblom et al. | |
| 2012/0117228 A1 * | 5/2012 | Gabriel | H04L 47/00 709/224 |
| 2013/0014107 A1 * | 1/2013 | Kirchhofer | G06F 9/5083 718/1 |
| 2013/0188554 A1 | 7/2013 | Cai et al. | |
| 2013/0215739 A1 | 8/2013 | Zhang | |
| 2013/0232492 A1 * | 9/2013 | Wang | G06F 9/4856 718/1 |
| 2013/0332584 A1 * | 12/2013 | Sun | H04L 67/1023 709/219 |
| 2013/0346572 A1 * | 12/2013 | Jain | G06F 9/5088 709/223 |
| 2014/0026133 A1 * | 1/2014 | Parker | G06F 9/5083 718/1 |
| 2014/0047351 A1 | 2/2014 | Cui et al. | |
| 2014/0090010 A1 | 3/2014 | Fletcher | |
| 2014/0100925 A1 | 4/2014 | Popescu et al. | |
| 2014/0112126 A1 | 4/2014 | Claessens | |
| 2014/0189050 A1 | 7/2014 | Rijsman et al. | |
| 2014/0229944 A1 * | 8/2014 | Wang | G06F 9/5088 718/1 |
| 2014/0237112 A1 | 8/2014 | Chen | |
| 2014/0241164 A1 | 8/2014 | Cociglio | |
| 2014/0269741 A1 * | 9/2014 | Ervin | H04L 45/306 370/401 |
| 2014/0280488 A1 * | 9/2014 | Voit | H04L 41/0895 709/203 |
| 2015/0030003 A1 * | 1/2015 | O'Neill | H04L 12/2856 370/331 |
| 2015/0263947 A1 | 9/2015 | Ortacdag | |
| 2015/0373617 A1 * | 12/2015 | Cho | H04W 28/0268 370/329 |
| 2016/0156735 A1 | 2/2016 | Rijsman et al. | |
| 2016/0080244 A1 | 3/2016 | Retana | |
| 2018/0006942 A1 * | 1/2018 | Rijsman | H04L 45/42 |
| 2022/0006731 A1 * | 1/2022 | Akhavain Mohammadi | H04L 47/25 |
| 2023/0315919 A1 * | 10/2023 | Yan | H04L 45/02 726/26 |

FOREIGN PATENT DOCUMENTS

| | | |
|---|---|---|
| CN | 103141058 A | 6/2013 |
| EP | 2533480 | 12/2012 |

OTHER PUBLICATIONS

Extended European Search Report corresponding to EP 18180691.0 mailed Aug. 27, 2018, 17 pages.
Extended European Search Report corresponding to EP 13199820.5 mailed Mar. 31, 2014, 5 pages.
Bjorklund, "YANG-A Data Modeling Language for the Network Configuration Protocol (NETCONF)", IETF RFC 6020, http://datatracker.ietf.org/doc/rfc6020/, Oct. 2010, 173 pages.

(56) References Cited

OTHER PUBLICATIONS

Extended European Search Report corresponding to EP 14 178 847.1 mailed Dec. 12, 2014, 6 pages.
"OpenFlow Switch Specification",Sep. 6, 2012 (Sep. 6, 2012), XP055111238, Retrieved from the Internet: URL:https://www.opennetworking.org/images/stories/downloads/sdn-resources/onf-specifications/openflow/openflow-spec-v1.3.1.pdf [retrieved on Nov. 24, 2014], Open Networking Foundation, 128 pages.

* cited by examiner

400 

| IP Address 410 | Data Flow Instruction 420 | Path Attributes 430 |
|---|---|---|
| IP Address 1 | Compress data flow<br>Provide data flow to server device #123 via path #1 | Admin distance value = 5<br>As-path value = 1 |
| IP Address 1 | Compress data flow<br>Provide data flow to server device #123 via path #2 | Admin distance value = 10<br>As-path value = 1 |
| IP Address 2 | Data flow instruction set #3 | Attribute value set #3 |
| IP Address 3 | Data flow instruction set #4 | Attribute value set #4 |
| IP Address 4 | Data flow instruction set #5 | Attribute value set #5 |
| IP Address 5 | Data flow instruction set #6 | Attribute value set #6 |

Fig. 4

REMOTELY UPDATING ROUTING TABLES

RELATED APPLICATIONS

This application is a continuation of U.S. patent application Ser. No. 13/955,945, filed on Jul. 31, 2013 (now U.S. Pat. No. 10,135,732), which is a continuation-in-part of U.S. patent application Ser. No. 13/740,781, filed on Jan. 14, 2013 (now U.S. Pat. No. 8,954,535), which claims priority to U.S. Provisional Patent Application No. 61/747,930, filed Dec. 31, 2012, the disclosures of which are hereby incorporated herein by reference.

BACKGROUND

Network devices, such as routers, are sometimes used to process, route, and provide services to data flows between user devices and server devices. Network devices sometimes include routing tables that define how a network device is to process a data flow. Updating routing tables in a timely manner may be difficult, thereby causing data flows to be processed inefficiently.

SUMMARY

According to some possible implementations, a method may include receiving, by a network device, an instruction to update a routing table implemented by the network device and updating, by the network device, the routing table based on receiving the instruction. The routing table may include a routing instruction to direct the network device to provide a data flow to a server device for processing. The method may include receiving, by the network device, the data flow destined for a destination device; determining, by the network device, the routing instruction based on a portion of an internet protocol address associated with the data flow and based on the routing table; executing, by the network device, the routing instruction to provide the data flow to the server device and to cause the data flow to be processed by the server device to form a processed data flow; and receiving, by the network device, the processed data flow and providing the processed data flow towards the destination device.

According to some possible implementations, a network device may receive an instruction to update a data structure implemented by the network device and update the data structure based on receiving the instruction. The data structure may include a routing instruction to direct the network device to provide a data flow to a server device for processing. The network device may receive the data flow destined for a destination device; determine the routing instruction based on at least a portion of an internet protocol address associated with the data flow and based on the data structure; execute the routing instruction to provide the data flow to the server device and to cause the data flow to be processed by the server device to form a processed data flow; and receive the processed data flow and provide the processed data flow towards the destination device.

According to some possible implementations, a computer-readable medium, for storing instructions, may include multiple instructions which, when executed by one or more processors, cause the one or more processors to receive an instruction to update a data structure corresponding to a routing information base implemented by a network device; update the data structure based on receiving the instruction. The data structure may include a routing instruction to direct the network device to provide a data flow to a server device for processing. The multiple instructions may further cause the one or more processors to receive the data flow destined for a destination device; determine the routing instruction based on an address associated with the data flow and based on the data structure; execute the routing instruction to provide the data flow to the server device and to cause the data flow to be processed by the server device to form a processed data flow; and receive the processed data flow and provide the processed data flow towards the destination device.

BRIEF DESCRIPTION OF THE DRAWINGS

FIG. 4 illustrates an example data structure that may be stored by one or more devices in the environment of FIG. 2;

DETAILED DESCRIPTION

The following detailed description refers to the accompanying drawings. The same reference numbers in different drawings may identify the same or similar elements.

Systems and/or methods, as described herein, may allow a server device to remotely access and modify routing tables, associated with a network device, in order to modify how the network device routes and/or processes data flows received by the network device. Additionally, or alternatively, the server device may be used to process a data flow on behalf of the network device. In some implementations, the server device may modify the routing tables to direct the network device to provide the data flow to the server device for processing.

Figure 1:
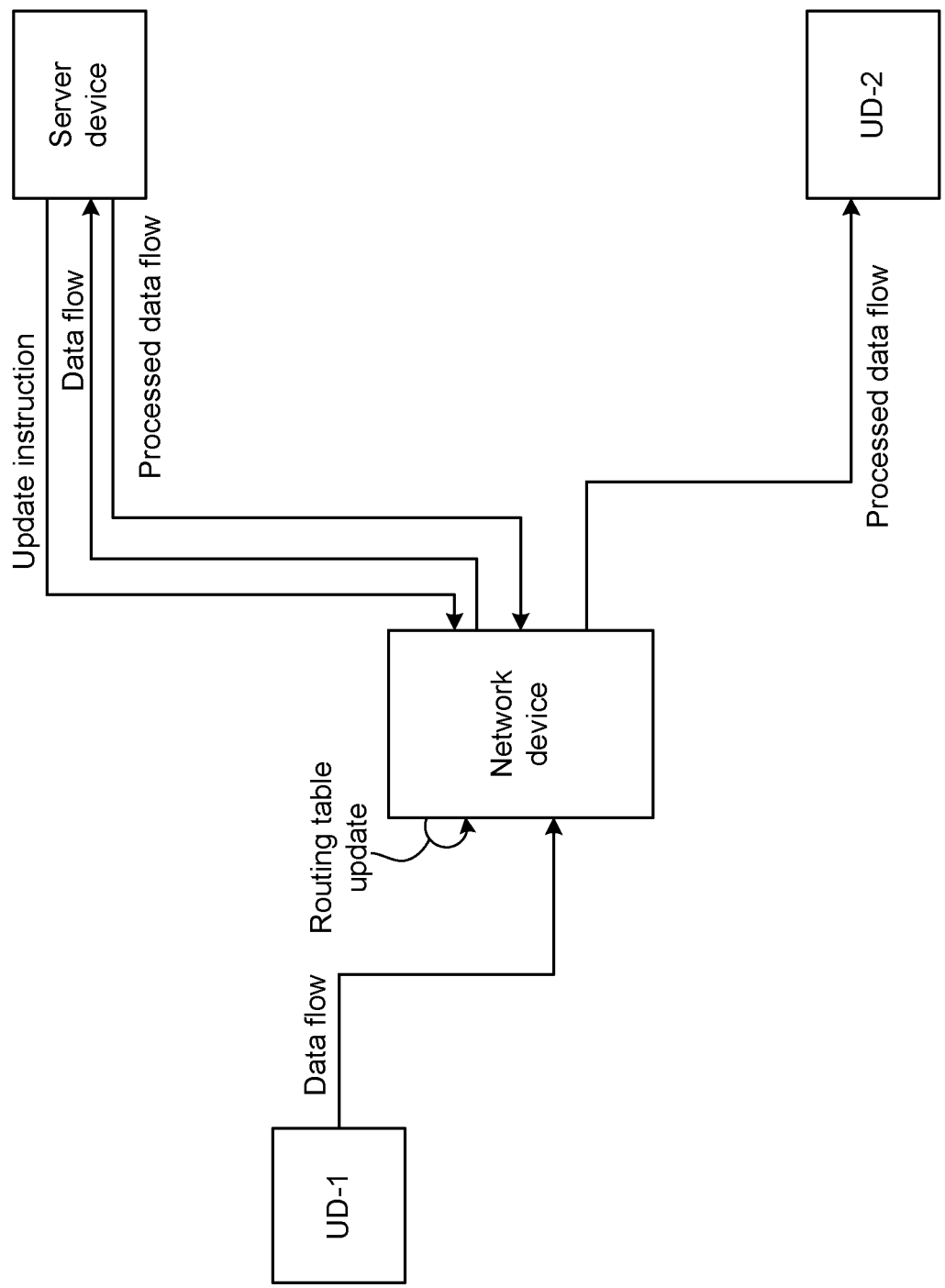
FIG. 1 illustrates an example overview of an implementation described herein.

FIG. 1 illustrates an example overview of an implementation described herein. As shown in FIG. 1, a server device may provide an update instruction to a network device to cause the network device to update a routing table implemented by the network device. In some implementations, the network device may update the routing table such that data flows, received by the network device, are provided to the server device for processing. For example, the server device may process a data flow on behalf of the network device to apply a particular Quality of Service (QoS) treatment, apply a firewall service, provide a virus scanning service, provide a deep packet inspection service, and/or provide some other service to the data flow.

In some implementations, the server device may provide the instruction when the server device receives an instruction (e.g., from an operator of the server device) to process data flows on behalf of the network device (e.g., when a virtual machine is implemented on the server device and used to process the data flows). Additionally, or alternatively, the server device may provide the instruction based on determining that the server device (or the virtual machine implemented by the server device), used to process data flows, is overloaded (e.g., to alleviate the overloaded server device or virtual machine). Additionally, or alternatively, the server device may provide the instruction to implement an updated routing protocol associated with a network service provider associated with the network device.

As shown in FIG. 1, the network device may receive a data flow from a first user device ("UD-1") destined for a second user device ("UD-2"), and may provide the data flow to the server device (e.g., based on information in the routing table that directs the network device to provide the data flow to the server device). In some implementations, the server device may process the data flow, to form a processed data flow, and may provide the processed data flow to the network device. The network device may provide the processed data flow to UD-2 based on receiving the processed data flow from the server device. As a result, the server device may remotely access the routing table implemented by the network device such that the network device may route data flows to the server device when the server device implements a service to process a data flow on behalf of the network device.

Figure 2:
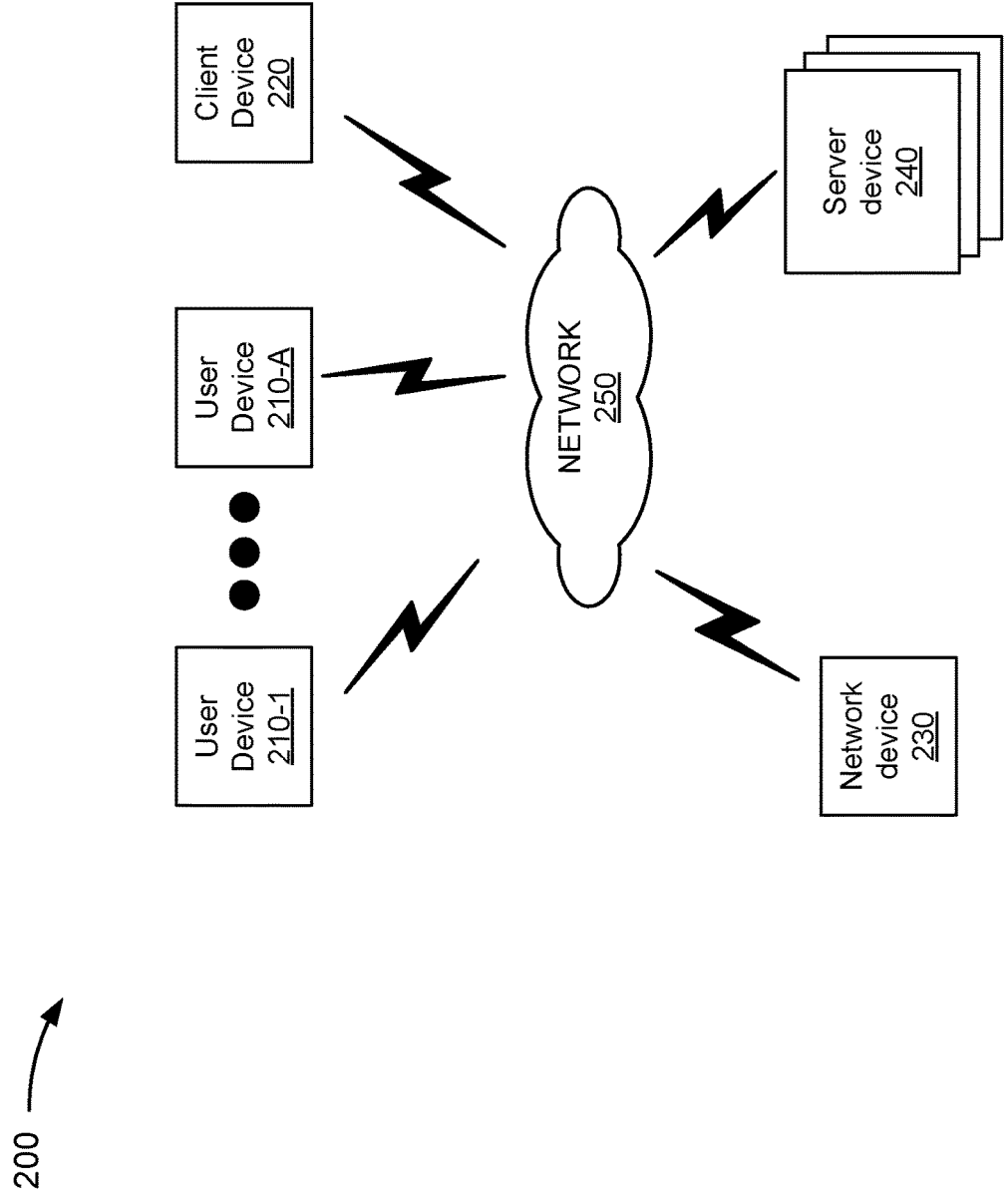
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-A (where A≥1), client device 220, network device 230, server device(s) 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a gaming device, a desktop computer, a server, or some other type of computing device.

Client device 220 may include a computing device or a collection of computing devices. In some implementations, client device 220 may be used to develop and/or install a service on server device 240 (e.g., to direct server device 240 to process a data flow on behalf of network device 230). For example, client device 220 may provide server device 240 with a service installation instruction, an application, a virtual machine, etc. that server device 240 may use to install the service and process the data flow on behalf of network device 230.

Network device 230 may include a network routing device or a collection of network routing devices. In some implementations, network device 230 may include a router, a switch, a gateway, an access point, or some other type of network device. In some implementations, network device 230 may receive data flows, and may process data flows in accordance with parameters specified in a routing table implemented by network device 230. In some implementations, the routing table may correspond to a routing information base (RIB) or some other type of routing table. In some implementations, network device 230 may include a physical routing device and/or a virtual routing device (e.g., a virtual image stored by a server to function as a physical routing device).

Server device 240 may include one or more computing devices, such as a server device or a collection of service devices. In some implementations, server device 240 may install a service based on receiving an instruction from an operator of server device 240 and/or from client device 220. For example, server device 240 may install an application, a virtual machine, or the like to provide a service to a data flow on behalf of network device 230.

In some implementations, environment 200 may include multiple server devices 240, which may be provided as part of a data center. For example, the data center may connect multiple server devices 240 such that services provided by the multiple server devices 240 may be pooled together and such that the services provided by the multiple server devices 240 may be readily accessible by network device 230. In some implementations, each server device 240 may implement multiple virtual machines that may process data flows received by network device 230.

In some implementations, server device 240 may provide an active service and/or a passive service to a data flow. For example, in an active service, server device 240 may modify, drop, or insert packets in the data flow. In a passive service, for example, server device 240 may monitor the data flow and may not forward the data flow. In some implementations, a passive service may operate on a copy or a sample of the data flow.

In some implementations, a particular virtual machine implemented by server device 240 may opt-out of providing a particular service for a particular session or a particular portion of a session. For example, assume that server device 240 provides a hypertext transfer protocol (HTTP) service to an HTTP message and that server device 240 may provide the service to the HTTP message based on a header of an HTTP message. Further assume that the header of the HTTP message is received by server device 240 via a first portion of a session, and that a body of the HTTP message is received by server device 240 via a second portion of the session. Given these assumptions, server device 240 may opt-out of providing the HTTP service for the second portion of the session since server device 240 may provide the HTTP service to the HTTP message based on the header of the HTTP message and may not be in need of the body of the HTTP message. In some implementations, service opt-out may result in a performance improvement by reducing the number of sessions or portions of a session in which a service is provided.

In some implementations, server device 240 may identify additional services to apply to different data flows on a per-flow basis. For example, server device 240 may perform a deep packet inspection service to a data flow, may identify a type of session associated with the data flow (e.g., a video type session), and may identify an additional service to apply to the data flow based on the type of session. For a video type session, for example, server device 240 may provide a caching service, whereas for another type of session in another data flow, server device 240 may provide some other service (e.g., an intrusion detection service, or some other service). As a result, different data flows may be directed to different virtual machines implemented by server device 240.

Network 250 may include one or more wired and/or wireless networks. For example, network 250 may include a cellular network, a public land mobile network (PLMN), a second generation (2G) network, a third generation (3G) network, a fourth generation (4G) network, a fifth generation (5G) network, and/or another network. Additionally, or alternatively, network 250 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
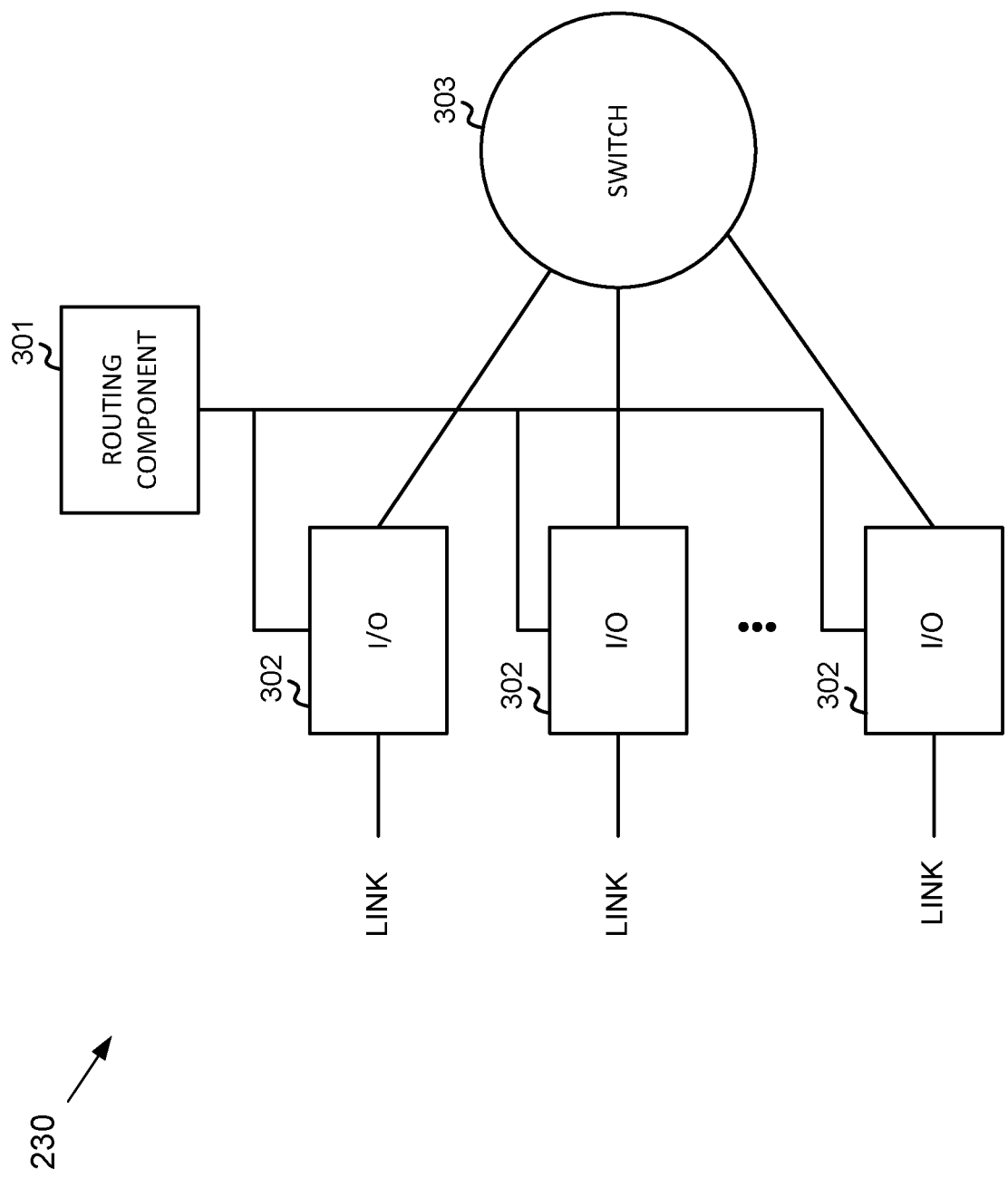
FIG. 3A illustrates example components of a network device.

FIG. 3A illustrates example components of network device 230. As shown in FIG. 3A, network device 230 may include routing component 301, input/output (I/O) components 302, and switch 303.

Routing component 301 may include a routing processor or a collection of routing processors. In some implementations, routing component 301 may perform a high level management function for network device 230. For example, routing component 301 may communicate with networks and/or systems connected to network device 230 to exchange information regarding network topology. In some implementations, routing component 301 may generate routing tables based on network topology information, may generate forwarding tables based on the routing tables, and may send the forwarding tables to I/O components 302. In some implementations, routing component 310 may perform other general control and monitoring functions for network device 230.

I/O component 302 may include an interface device or a collection of interface devices. In some implementations, I/O component 302 may connect to routing component 301 and switch 303. In some implementations, I/O component 302 may receive packets on physical links connected to a network. Each physical link could be one of many types of transport media, such as optical fiber or Ethernet cable. The packets on the physical link may be formatted according to one of several protocols, such as the synchronous optical network (SONET) standard or Ethernet. In some implementations, I/O component 302 may use forwarding tables to perform route lookup for incoming data flows.

Switch 303 may include one or more switching planes to facilitate communication between two or more of I/O components 302. In some implementations, switch 303 may include a single or multi-stage switch fabric.

In some implementations, network device 230 may include additional components, fewer components, different components, or differently arranged components than are shown in FIG. 3A.

Figure 3B:
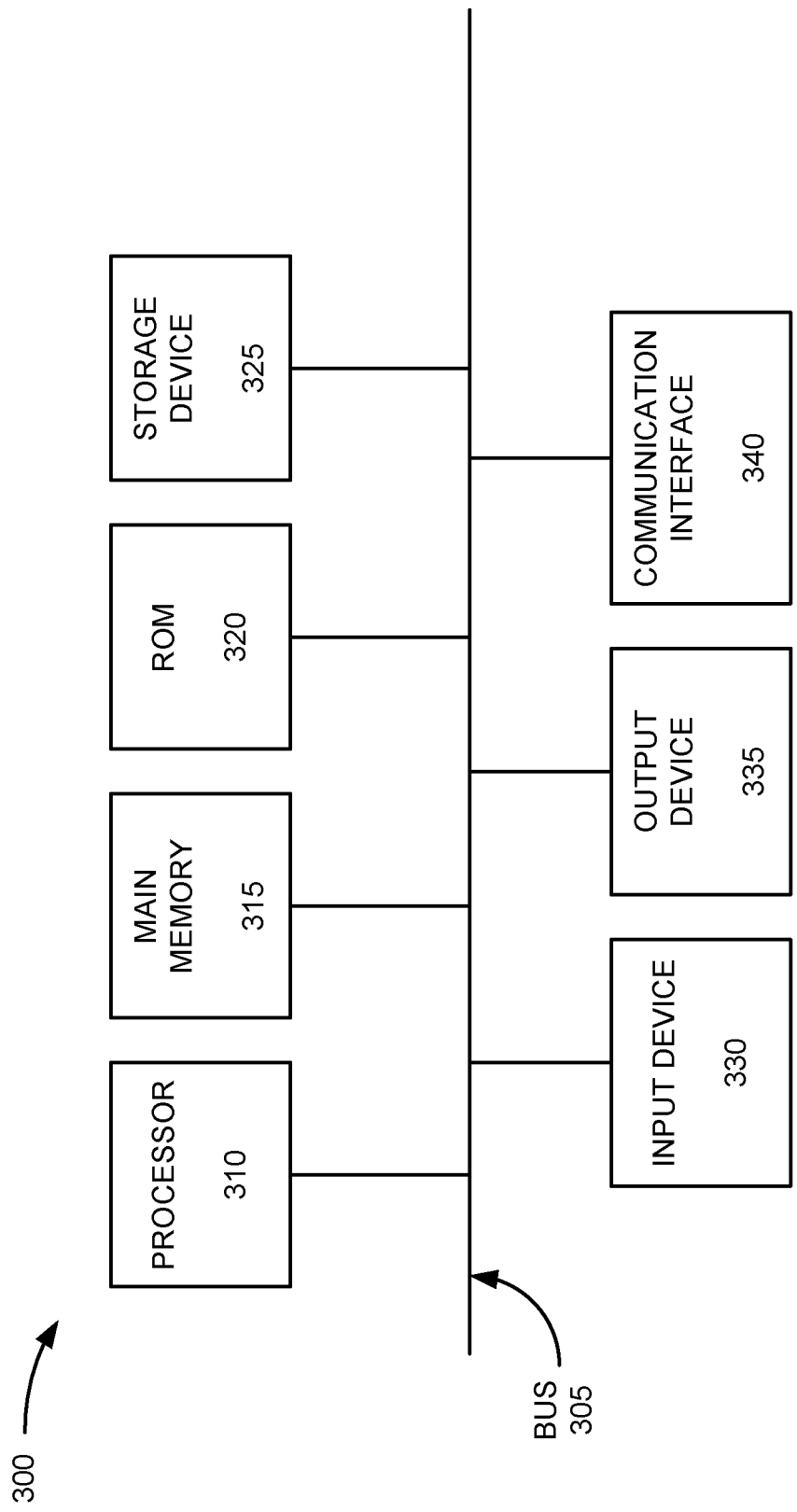
FIG. 3B illustrates example components of a device that may be used within the environment of FIG. 2.

FIG. 3B illustrates example components of a device 300 that may be used within environment 200 of FIG. 2. Device 300 may correspond to user device 210, client device 220, network device 230, and/or server device 240. Each of user device 210, client device 220, network device 230, and/or server device 240 may include one or more devices 300 and/or one or more components of device 300.

As shown in FIG. 3B, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3B.

FIG. 4 illustrates an example data structure 400 that may be stored by one or more devices in environment 200, such as network device 230. In some implementations, data structure 400 may be stored in a memory of network device 230. In some implementations, data structure 400 may be stored in a memory separate from, but accessible by, network device 230. In some implementations, data structure 400 may be stored by some other device in environment 200, such as server device 240. A particular instance of data structure 400 may contain different information and/or fields than another instance of data structure 400.

In some implementations, data structure 400 may store a routing table having routing instructions for data flows received by network device 230. In some implementations, a set of routing instructions may be stored for data flows received via a particular IP address (or via an IP address prefix). In some implementations, information stored by data structure 400 may be updated when network device 230 discovers a routing path, when an operator of network device 230 or server device 240 manually updates data structure 400, when server device 240 implements a service to process a data flow on behalf of network device 230, when server device 240 instructs that data structure 400 is to be updated, and/or based on some other factor. In some implementations, the routing table, stored by data structure 400, may correspond to a routing information base (RIB) of network device 230.

As shown in FIG. 4, data structure 400 may include IP address field 410, data flow instruction field 420, and path attributes field 430.

IP address field 410 may include information that identifies an IP address having a corresponding set of data flow instructions. In some implementations, IP address field 410 may store a portion of an IP address (e.g., a prefix, such as an IPv4, an IPv6, a multiprotocol label switching (MPLS) prefix, and/or some other type of prefix). In some implementations, network device 230 may identify a particular instruction for data flows received via an IP address (or via an IP address having a particular prefix) based on information stored by IP address field 410. As used herein, the term "IP address" may refer to a complete IP address or an IP address having a particular prefix. In some implementations, IP address field 410 may store a type of address other than an IP address.

Data flow instruction field 420 may store routing instructions that determine how a particular data flow, associated with a particular IP address, is to be processed. In some implementations, network device 230 may execute the routing instructions for the data flow associated with the corresponding IP address in IP address field 410. For example, network device 230 may execute instruction set #1 for data flows received via IP address #1. In some implementations, information stored by routing instructions field 420 may direct network device 230 to apply a particular QoS to a data flow, provide the data flow to a particular network device 230, provide a service to the data flow (e.g., a rate-limit service, a firewall service, a packet marking service, or the like), provide the data flow to a particular server device 240 for processing (e.g., to allow server device 240 to apply a service to the data flow), duplicate the data flow and send copies of the data flow to multiple destinations, distribute the data flow to multiple destinations via multiple interfaces, and/or perform some other task related to the data flow. In some implementations, routing instructions field 420 may store information identifying a routing path via which to transmit the data flow (e.g., a path that provides the data flow to a particular network device 230, a particular server device 240, or some other device).

Path attributes field 430 may store attributes for a particular set of data flow instructions (e.g., attributes for a routing path associated with the particular set of data flow instructions). In a situation where data structure 400 stores multiple sets of data flow instructions for data flows associated with a particular IP address (or via a particular IP address prefix), network device 230 may determine which set of data flow instructions to execute based on information stored by path attributes field 430. For example, path attributes field 430 may store attributes for a routing path associated with a particular set of data flow instructions, such as an "as-path" value, an admin distance value, a metric value, and/or some other type of attribute that allows network device 230 to select a particular data flow instruction set to execute. For example, network device 230 may select a data flow instruction having a lower admin distance value than another data flow instruction.

As an example, assume that data structure 400 stores multiple sets of routing instructions for a data flow received via a particular IP address. That is, IP address field 410 stores multiple instances of the particular IP address (e.g., IP address 1). Further, assume that corresponding sets of routing instructions direct network device 230 to provide the data flow to a particular server device 240 via different paths. For example, assume that first set of routing instructions (e.g., routing instruction set 1) direct network device 230 to provide the data flow to a particular server device 240 via a first path and that a second set of routing instructions (e.g., routing instruction set 2) direct network device 230 to provide the data flow to the particular server device 240 via a second path. Further, assume that path attributes field 430 stores an admin distance value of five for routing instruction set 1 and an admin distance value of ten for routing instruction set 2. Given these assumptions, network device 230 may select to execute routing instruction set 1 since the admin distance value of routing instruction set 1 is lower than the admin distance value of routing instruction set 1.

While particular fields are shown in a particular format in data structure 400, in practice, data structure 400 may include additional fields, fewer fields, different fields, or differently arranged fields than are shown in FIG. 4.

Figure 5:
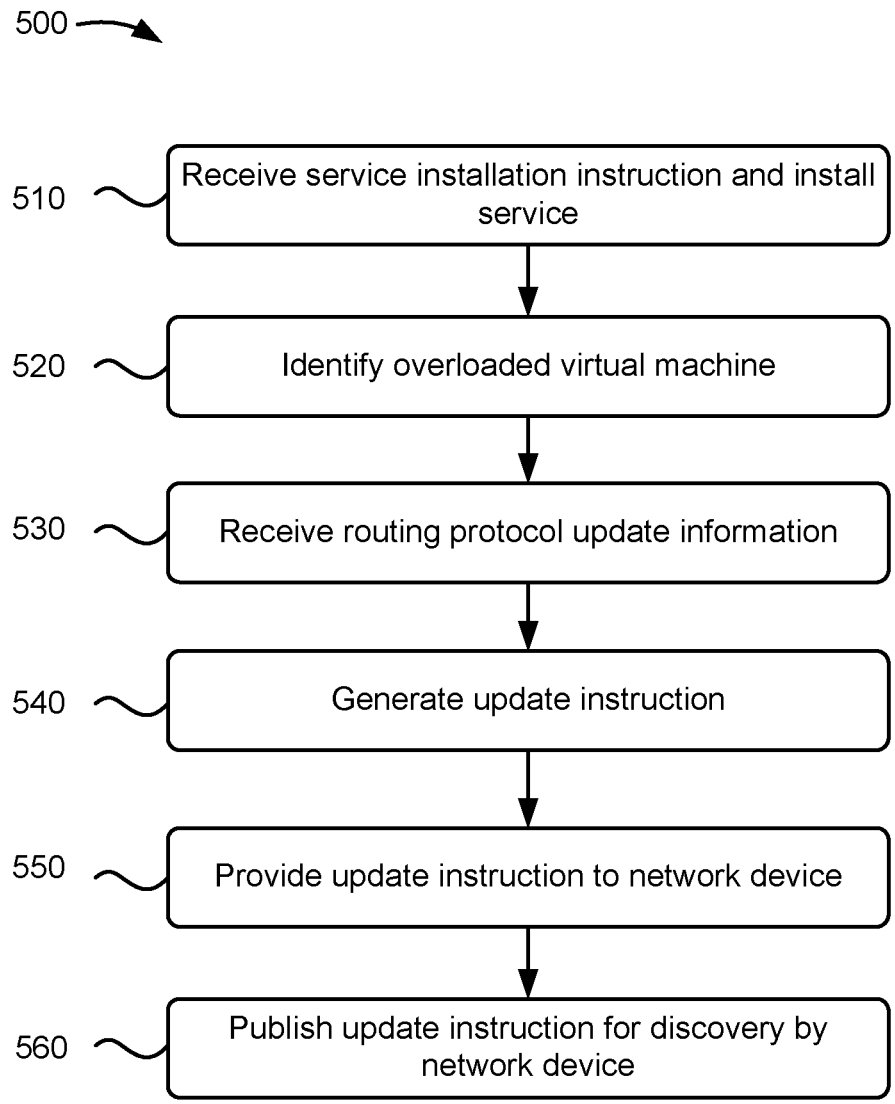
FIG. 5 illustrates an example flowchart for providing an update instruction to a network device.

FIG. 5 illustrates an example flowchart for providing an update instruction to a network device. In one implementation, process 500 may be performed by one or more components of server device 240. In another implementation, some or all of blocks of process 500 may be performed by one or more components of another device in environment 200 (e.g., network device 230), or a group of devices including or excluding server device 240.

As shown in FIG. 5, process 500 may include receiving a service installation instruction and installing the service (block 510). For example, server device 240 may receive the service installation instruction from an operator of server device 240 and/or from client device 220. Additionally, or alternatively, server device 240 may generate the service installation instruction based on identifying an overloaded virtual machine (as described in greater detail below with respect to block 520).

In some implementations, the service installation instruction may identify a service that server device 240 may provide to a data flow received by network device 230 (e.g., via a particular IP address) in order to process the data flow on behalf of network device 230. For example, the service installation instruction may identify a firewall service, a compression service, or some other type of service for which server device 240 may provide to the data flow. In some implementations, the service installation instruction may identify a particular network device 230 that receives the data flow that server device 240 is to provide the service. In some implementations, server device 240 may install the service by installing a virtual machine that includes applications, scripts, virtual hardware components, etc. that may be used to provide the service to the data flow. In some implementations, a developing party may generate a service installation instruction and/or a virtual machine on behalf of a deploying party. That is, a deploying party may license a particular service installation instruction and/or a particular virtual machine from the developing party.

Process 500 may also include identifying an overloaded virtual machine (block 520). For example, server device 240 may identify an overloaded virtual machine based on processing activity data associated with the virtual machine. In some implementations, the server device 240 may log processing information relating to a measure of load associated with the virtual machine (e.g., processor usage, such as floating-point operations per second, random-access memory (RAM) usage, etc.). In some implementations, server device 240 may identify that the virtual machine is overloaded when the measure of load exceeds a particular threshold. In some implementations, server device 240 may generate a service installation instruction to generate another virtual machine based on identifying the overloaded virtual machine (e.g., to alleviate the overloaded virtual machine). In some implementations, server device 240 may identify an under-loaded virtual machine (e.g., a virtual machine having processing capacity to process a data flow to alleviate the overloaded virtual machine).

Process 500 may further include receiving routing protocol update information (block 530). For example, server device 240 may receive the routing protocol update information from an operator of server device 240 and/or from some other source. In some implementations, the routing protocol update information may identify how a data flow is to be treated when the data flow is received by network device 230. For example, the routing protocol update information may identify QoS parameters that are to be applied to the data flow, routing paths for the data flow, a particular type of routing protocol to use when routing the data flow, and/or some other type of information relating to how the data flow is to be treated.

Process 500 may also include generating an update instruction (block 540). For example, server device 240 may generate the update instruction based on one or more update instruction triggers, such as installing a virtual machine, identifying an overloaded virtual machine, receiving routing protocol update information, and/or based on some other factor. In some implementations, the update instruction may direct network device 230 to update a routing table implemented by network device 230 (e.g., a routing table corresponding to data structure 400). For example, network device 230 may update a set of data flow instructions for a data flow associated with a particular IP address (or generate a new set of data flow instructions for a data flow associated with the particular IP address). As described above, the set of data flow instructions may identify how a data flow, associated with the particular IP address, is to be treated (e.g., services that may be provided to the data flow via a particular server device 240, QoS treatments that may be provided to the data flow, etc.). In some implementations, the update instructions may identify a particular network device 230 that is to update the routing table. In some implementations, server device 240 may encrypt the update instructions to prevent unauthorized modification of the update instructions.

As an example, assume that server device 240 installs a virtual machine as described above with respect to block 510. Given this assumption, server device 240 may generate an update instruction that identifies a particular IP address associated with a data flow received by network device 230 (e.g., a data flow that server device 240 is to process using the virtual machine). In some implementations, the update instruction may identify an IP address (or some other identifier) of server device 240 and/or an identifier of the virtual machine. In some implementations, the update instruction may identify a routing instruction that network device 230 may execute for data flows associated with the particular IP address. For example, the routing instruction may direct network device 230 to provide a compression service to the data flow, provide the data flow for processing to server device 240 (e.g., based on the IP address of server device 240), and/or mark the data flow with an identifier associated with the identifier of the virtual machine (e.g., such that server device 240 may identify a particular virtual machine to use to process the data flow).

As another example, assume that server device 240 identifies an overloaded virtual machine as described above with respect to block 520. Further, assume that server device 240 creates a new virtual machine and/or identifies an under-loaded virtual machine to alleviate the overloaded virtual machine. Given these assumptions, server device 240 may generate an update instruction that causes network device 230 to provide a data flow to the new virtual machine and/or the under-loaded virtual machine in lieu of providing the data flow to the overloaded virtual machine. For example, the update instruction may modify the routing instruction in the routing table such that network device 230 marks the data flow for processing via the new virtual machine and/or the under-loaded virtual machine.

As another example, assume that server device 240 receives routing protocol update information that identifies how a data flow is to be treated. Given this assumption, server device 240 may generate an update instruction that causes network device 230 to treat the data flow in accordance with the routing protocol update. For example, the update instruction may cause network device 230 to provide a particular QoS to the data flow, provide the data flow to a particular server device 240 and/or a particular virtual machine, provide the data flow towards a destination via a particular routing path, provide the data flow via a particular routing protocol, or treat the data flow in some other manner.

As described above, server device 240 may generate an update instruction based on a combination of triggers or based on a single trigger. That is, server device 240 may generate an update instruction without installing a virtual machine, identifying an overloaded virtual machine, or receiving routing protocol update information. Additionally, or alternatively, server device 240 may generate an update instruction based on some other trigger.

Process 500 may further include providing the update instruction to the network device (block 550). For example, server device 240 may identify a particular network device 230 that is to receive the update instruction (e.g., based on information associated with the update instruction that identifies the particular network device 230). In some implementations, server device 240 may provide the update instruction to the particular network device 230 via an IP address associated with the particular network device 230. In some implementations, server device 240 may provide the update instruction via a secure channel.

Process 500 may also include publishing the update instruction for discovery by the network device (block 560). For example, server device 240 may broadcast an indication that an update instruction is available. In some implementations, network device 230 may discover the broadcasted indication based on querying server device 240 at particular time intervals (e.g., every 30 minutes, every 60 minutes, or some other time interval). Additionally, or alternatively, network device 230 may discover the indication based on some other technique. Network device 230 may communicate with server device 240 to request the update instruction and may receive the update instruction from server device 240. Additionally, or alternatively, server device 240 may authenticate network device 230 to receive the update instruction.

In some implementations, block 550 may be omitted (e.g., when server device 240 publishes the update instruction for discovery by network device 230). In some implementations, block 560 may be omitted (e.g., when server device 240 provides the update instruction to network device 230).

In some implementations, network device 230 may use the update instructions to modify a routing table implemented by network device 230. For example, as described above, network device 230 may modify the routing table to modify how a data flow, associated with a particular IP address, is treated and/or to identify a particular server device 240 and/or a particular virtual machine to which to provide the data flow to process the data flow on behalf of network device 230. As described in greater detail below, network device 230 may modify the routing table based on other factors in addition to, or in the alternative to receiving an update instruction from server device 240.

While a particular series of blocks has been described above with regard to FIG. 5, the operations, data flows, and/or the order of the blocks may be modified in other implementations. Further, non-dependent operations and/or data flows may be performed in parallel. Also, one or more of the blocks may be omitted in some implementations.

Figure 6:
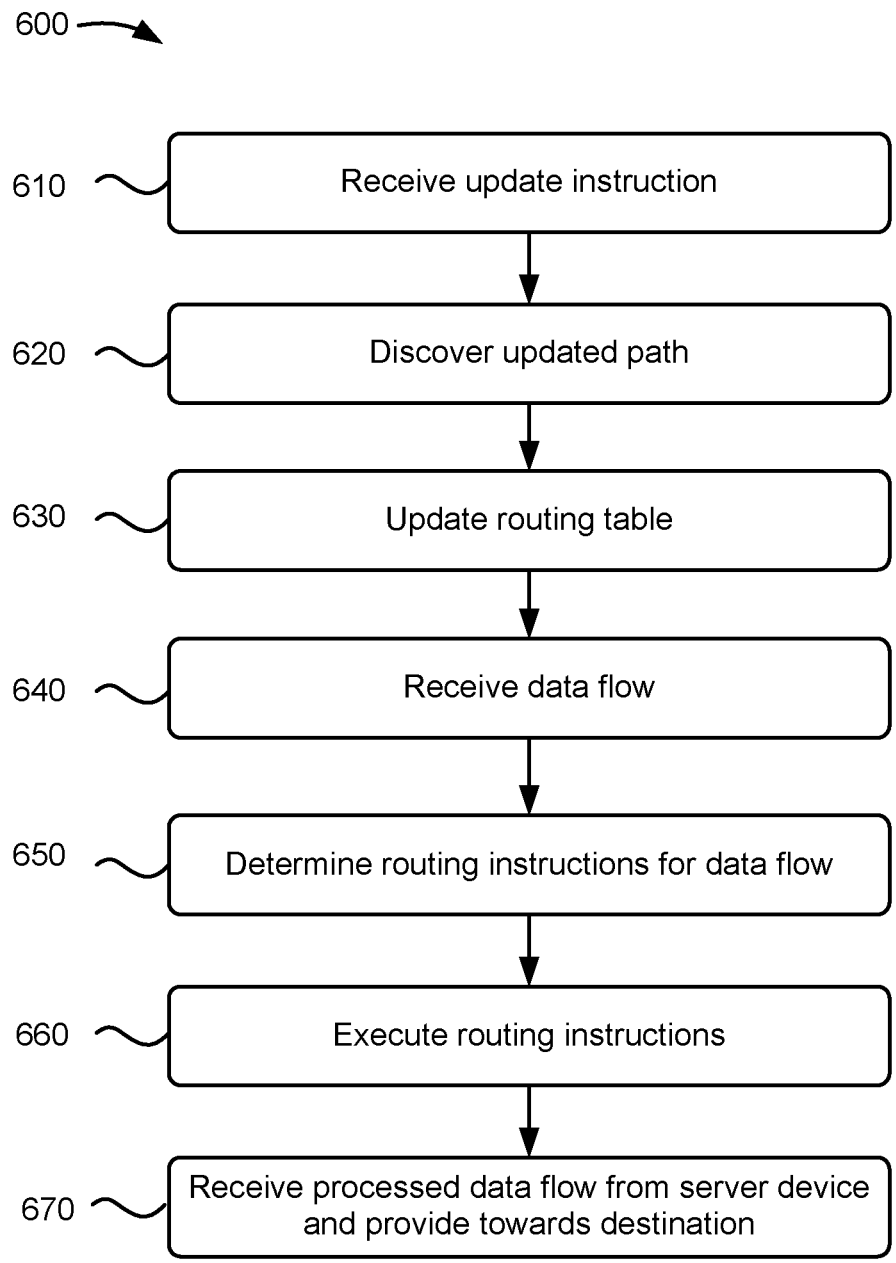
FIG. 6 illustrates an example flowchart for updating a routing table implemented by a network device.

FIG. 6 illustrates an example flowchart for updating a routing table implemented by a network device. In some implementations, process 600 may be performed by one or more components of network device 230. In some implementations, some or all of blocks of process 600 may be performed by one or more components of another device in environment 200 (e.g., server device 240), or a group of devices including or excluding network device 230.

As shown in FIG. 6, process 600 may include receiving an update instruction (block 610). For example, network device 230 may receive an update instruction from server device 240 in accordance with process 500 (e.g., when server device 240 provides the update instruction when installing a virtual machine used to process a data flow, identifying an overloaded virtual machine, receiving routing protocol update information, etc.). Additionally, or alternatively, network device 230 may discover the update instruction when server device 240 publishes the update instruction for discovery, as described above with respect to block 560.

Process 600 may further include discovering an updated routing path (block 620). For example, network device 230 may discover an updated routing path between network device 230, another network device 230, server device 240, and/or some other device. In some implementations, network device 230 may discover the updated routing path using the border gateway protocol (BGP) and/or some other protocol. In some implementations, network device 230 may discover the updated routing path based on modifications in network configuration (e.g., the addition or removal of network devices 230 in environment 200, the addition or removal of devices in network 250, the addition or removal of physical and/or logical links connecting devices in environment 200, etc.).

Process 600 may also include updating a routing table (block 630). For example, network device 230 may update the routing table based on receiving the update instruction and/or based on discovering the updated routing path. As described above, the routing table may correspond to a RIB associated with network device 230. In some implementations, network device 230 may modify routing instructions for data flows associated with a particular IP address based on the update instruction and/or based on the updated routing path. For example, when network device 230 receives an update instruction from server device 240, network device 230 may modify the routing table in accordance with the update instruction (e.g., to cause a data flow, associated with a particular IP, to be provided to a particular server device 240 for processing).

As an example, assume that the update instruction includes an instruction to cause network device 230 to provide data flows, associated with the IP address "123.1.1.1," to a particular server device 240 via a particular routing path (e.g., routing path #1). Given these assumptions network device 230 may store the IP address "123.1.1.1" in IP address field 410, may store an identifier for the particular server device 240 in data flow instruction field 420, routing path #1 in data flow instruction field 420, and an instruction to provide the data flow to server device 240 via routing path #1. In some implementations, network device 230 may identify attributes for the routing path and store the attributes in path attributes field 430. For example, as described above with respect to path attributes field 430, network device 230 may determine attributes for the routing path, such as an "as-path" value, an admin distance value, a metric value, and/or some other type of attribute that allows network device 230 to select a particular data flow instruction set to execute.

In some implementations (e.g., when network device 230 determines an updating routing path), network device 230 may modify the routing table based on the updated routing path (e.g., to cause a data flow to be routed via the updated routing path). For example, network device 230 may update information stored by data flow instruction field 420 based on the updated routing path. Further, network device 230 may update information stored by path attributes field 430 based on attributes of the updated routing path.

As described above, the routing table may identify how network device 230 is to process a data flow associated with a particular IP address. Further, the routing table may identify a routing path used to provide the data flow to a particular device (e.g., a particular server device 240). Thus, a modification in the routing table may modify how network device 230 is to process the data flow and the routing path. Further, server device 240 may cause network device 230 to modify the routing table (e.g., to direct network device 230 to provide a data flow to server device 240 for processing) based on providing network device 230 with an update instruction. As described above, the update instruction may be provided based on the installation of a service provided by server device 240, based on identifying an overloaded virtual machine of server device 240, and/or based on some other trigger. As a result, server device 240 may cause network device 230 to modify the routing table such that a data flow, associated with a particular IP address, is provided to server device 240 for processing.

In some implementations, network device 230 may determine attributes of a routing path identified by the routing table (e.g., a routing path identified by information stored by data flow instruction field 420). In some implementations, network device 230 may update the attributes when a routing path is modified based on receiving an update instruction and/or based on determining an updated routing path.

Process 600 may also include receiving a data flow (block 640). For example, network device 230 may receive a data flow from user device 210 destined for another user device 210 and/or some other device. In some implementations, network device 230 may receive the data flow associated with a particular IP address.

Process 600 may further include determining routing instructions for the data flow (block 650). For example, network device 230 may determine the routing instructions based on the routing table and based on the particular IP address. As an example, assume that the particular IP address, associated with the data flow, is "123.1.1.1." Further, assume that the routing table stores the IP address "123.1.1.1" and a corresponding set of routing instructions, such as "routing instruction set #1." Given these assumptions, network device 230 may determine routing instruction set #1.

In some implementations (e.g., when the routing table stores multiple sets of routing instructions for a particular IP address), network device 230 may determine a particular set of routing instructions based on the attributes of respective routing paths associated with the routing instructions. An example of network device 230 determining a particular set of routing instructions is described above with respect to path attributes field 430.

Process 600 may further include executing the routing instructions (block 660). For example, network device 230 may execute the routing instructions based on identifying the routing instructions. As described above with respect to data flow instruction field 420, the routing instructions may direct network device 230 to provide the data flow to a particular server device 240, mark the data flow to identify a particular virtual machine to process the data flow, provide a particular QoS treatment to the data flow, and/or provide some other to the data flow (e.g., a packet inspection service, a firewall service, a virus scan service, or some other type of service).

Process 600 may also include receiving a processed data flow and providing the processed data flow towards a destination (block 670). For example, as described above, network device 230 may provide a data flow to server device 240 (e.g., based on a routing instruction). In some implementations, server device 240 may receive the data flow and may process the data flow on behalf of network device 230. For example, server device 240 may provide a particular service to the data flow (e.g., a packet inspection service, a firewall service, a QoS treatment service, a virus scan service, a caching service, or some other type of service). In some implementations, server device 240 may provide the processed data flow to network device 230 such that network device 230 may provide the processed data flow towards a destination device (e.g., a particular user device 210). As a result, server device 240 may cause network device 230 to provide the data flow to server device 240 for processing (e.g., by causing network device 230 to modify the routing table as described above).

While a particular series of blocks has been described above with regard to FIG. 6, the operations, data flows, and/or the order of the blocks may be modified in other implementations. Further, non-dependent operations and/or data flows may be performed in parallel.

Figure 7:
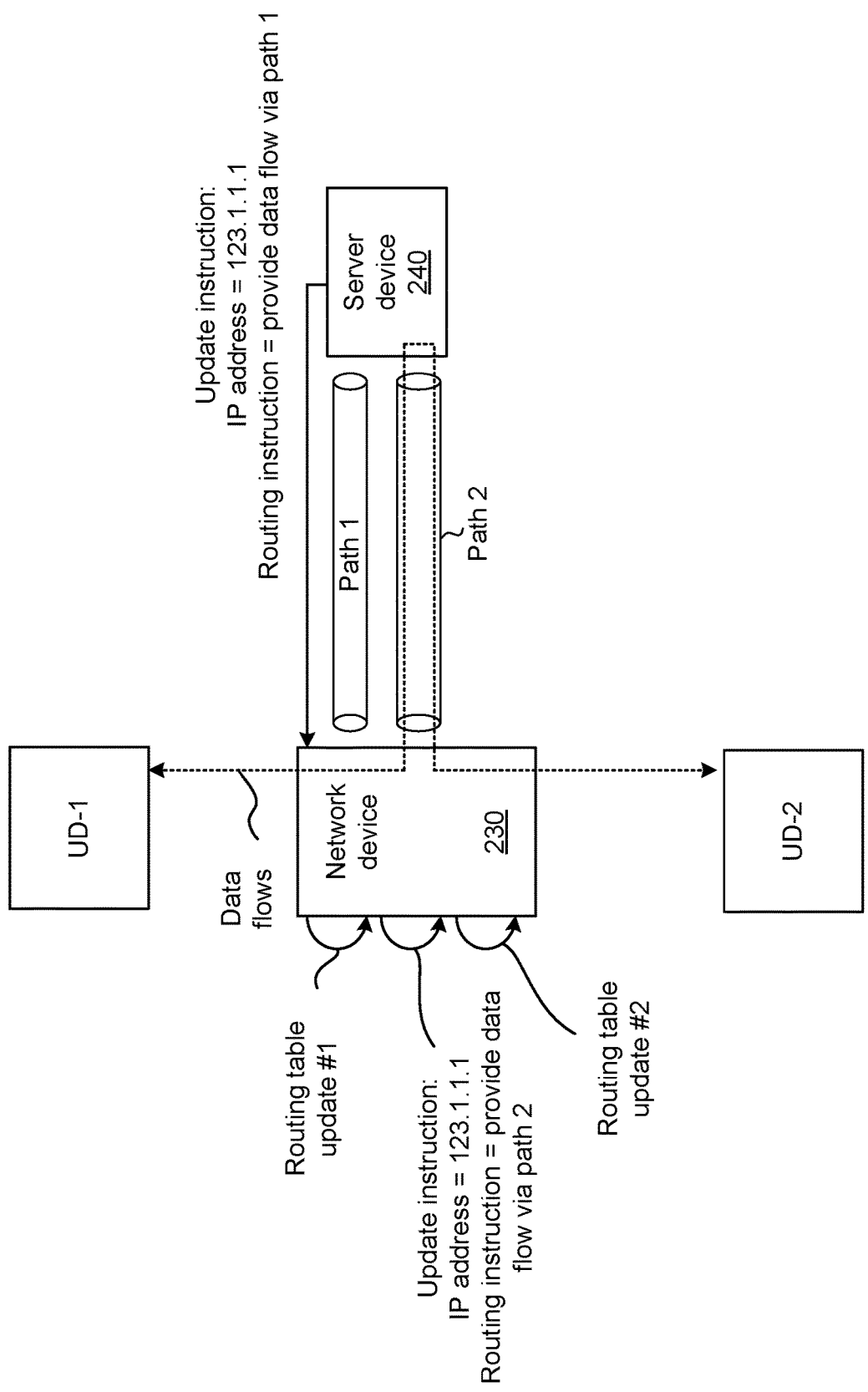
FIG. 7 illustrates an example implementation as described herein.

FIG. 7 illustrates an example implementation as described herein. In FIG. 7, assume that server device 240 provides network device 230 with an update instruction (e.g., to direct network device 230 to provide server device 240 with a data flow for processing). For example, the update instruction may include an IP address (e.g., the IP address "123.1.1.1") and a routing instruction to provide a data flow, associated with the IP address, to server device 240 via a particular data flow path (e.g., "path 1"). Given this assumption, network device 230 may update a routing table of network device 230 (as indicated by routing table update function #1) based on receiving the update instruction (e.g., in accordance with process 600). As described above, network device 230 may determine attributes of path #1 and may store the attributes in the routing table.

In FIG. 7, further assume that network device 230 discovers a path between network device 230 and server device 240 (e.g., a path that is different than path #1). For example, network device 230 may discover path #2 between network device 230 and server device 240 (e.g., using a BGP protocol, or some other type of protocol as described above). Given this assumption, network device 230 may update the routing table (as indicated by routing table update function #2) based on discovering the updated path. As described above, network device 230 may determine attributes of path #2 and may store the attributes in the routing table.

As shown in FIG. 7, network device 230 may receive a data flow from user device 210-1 (UD-1) that is destined for user device 210-2 (UD-2). In FIG. 7, assume that network device 230 receives the data flow via IP address "123.1.1.1." Given this assumption, network device 230 may identify routing instructions for the data flow based on the IP address. As described above, network device 230 may include multiple sets of routing instructions for the data flow (e.g., based on routing table update function #1 and routing table update function #2). In some implementations, network device 230 may identify which set of routing instructions to execute based on the attributes of the paths associated with respective sets of routing instructions.

In FIG. 7, assume that network device 230 stores information identifying an attribute for path #1, such as an admin distance value of 15. Further, assume that network device 230 stores information identifying an attribute for path #2, such as an admin distance value of 10. Further, assume that network device 230 is to select the path with the lowest admin distance value. Given these assumptions, network device 230 may select to provide a data flow via path #2 since the admin distance value of path #2 is lower than the admin distance value of path #1. As a result, the routing table may be updated such that a data flow may be provided to server device 240 via a path having a preferred attribute. Further, server device 240 may receive the data flow via path #2 (e.g., to process the data flow on behalf of network device 230) and may provide a processed data flow to network device 230 to allow network device 230 to provide the processed data flow towards a destination device (e.g., UD-2).

As described above, server device 240 may remotely access a routing table implemented by network device 230 such that network device 230 may route data flows to server device 240 when server device 240 implements a service to process a data flow on behalf of network device 230. Further, network device 230 may update the routing table based on discovering an updated path between server device 240 and network device 230 (e.g., a path having a lower admin distance value or some other attribute). As a result, network device 230 may keep the routing table up to date such that a data flow is provided to server device 240 via the updated path (e.g., such that server device 240 may process the data flow on behalf of network device 230 and such that the data flow is provided via the updated path to reduce network traffic and/or to improve network performance).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   configuring, by a first device, a service to process a data flow, associated with an Internet Protocol (IP) address, on behalf of a second device based on identifying that a measure of load associated with a virtual machine satisfies a threshold;
   obtaining, from a third device and by the first device, routing update information that identifies a protocol enabling the service to process the data flow on behalf of the second device;
   generating, by the first device, based on obtaining the routing update information and configuring the service, an update instruction indicating how the service is to process the data flow associated with the IP address and enabling the service to process the data flow instead of with the virtual machine; and
   providing, by the first device, the update instruction to the second device.

2. The method of claim 1, where the service is provided to the data flow to be received by the second device.

3. The method of claim 1, further comprising:
   configuring the virtual machine,
      wherein the virtual machine provides.

4. The method of claim 1, further comprising:
   generating a service installation instruction to generate another virtual machine based on identifying that the measure of load associated with the virtual machine satisfies the threshold.

5. The method of claim 1, further comprising:
   identifying, based on identifying that the measure of load associated with the virtual machine satisfies the threshold, another virtual machine associated with another measure of load that satisfies another threshold to process the data flow; and
   processing the data flow based on identifying the other virtual machine.

6. The method of claim 1, where the update instruction causes the second device to at least one of:
   provide a particular quality of service to the data flow,
   provide the data flow to another device or another virtual machine, or
   provide the data flow toward a destination via a particular routing path.

7. The method of claim 1, where the routing update information identifies one or more of:
   quality of service parameters to be applied to the data flow,
   routing paths for the data flow, or
   a type of the protocol to be used when routing the data flow.

8. A first device, comprising:
   a memory; and
   one or more processors to:
      configure a service to process a data flow, associated with an identifier, on behalf of a second device based on identifying that a measure of load associated with a virtual machine satisfies a threshold;
      obtain, from a third device, routing update information that identifies a protocol enabling the service to process the data flow on behalf of the second device;
      generate, based on obtaining the routing update information, an update instruction indicating how the service is to process the data flow associated with the identifier, and enabling the service to process the data flow instead of with the virtual machine; and
      provide the update instruction to the second device.

9. The first device of claim 8, where the update instruction includes a modification of a routing instruction, in a routing table, to mark the data flow for processing via another virtual machine.

10. The first device of claim 8, where the update instruction identifies a routing instruction that the second device is to execute for the data flow.

11. The first device of claim 8, where the update instruction causes the second device to provide the data flow to another virtual machine.

12. The first device of claim 8, where the update instruction causes the second device to at least one of:
   provide a particular quality of service to the data flow,
   provide the data flow to another device or another virtual machine,
   provide the data flow toward a destination via a particular routing path, or
   provide the data flow via a particular routing protocol.

13. The first device of claim 8, where the one or more processors are further to:
   generate a service installation instruction to generate another virtual machine based on identifying that the measure of load associated with the virtual machine satisfies the threshold.

14. The first device of claim 8, wherein a routing table includes a data instruction field that stores routing instructions that determine how the data flow is processed.

15. A non-transitory computer-readable medium storing instructions, the instructions comprising:
   one or more instructions that, when executed by one or more processors of a first device, cause the one or more processors to:
      configure a service to process a data flow, associated with an identifier, on behalf of a second device based on identifying that a measure of load associated with a virtual machine satisfies a threshold;
      obtain, from a third device, routing update information that identifies a protocol enabling the service to process the data flow on behalf of the second device;
      generate, based on receiving the routing update information, an update instruction indicating how the service is to process the data flow associated with the identifier and enabling the service to process the data flow instead of with the virtual machine; and
      provide the update instruction to the second device.

16. The non-transitory computer-readable medium of claim 15, where the one or more instructions, that cause the one or more processors to generate the update instruction, cause the one or more processors to:

generate the update instruction without configuring another virtual machine.

17. The non-transitory computer-readable medium of claim 15, where the one or more instructions, that cause the one or more processors to generate the update instruction, cause the one or more processors to:

broadcast an indication that the update instruction is available.

18. The non-transitory computer-readable medium of claim 15, where the first device receives a query, from the second device, periodically, and the update information being discovered based on the query.

19. The non-transitory computer-readable medium of claim 15, where the update instruction causes the second device to at least one of:

provide a particular quality of service to the data flow,
   provide the data flow to another device or another virtual machine,
   provide the data flow toward a destination via a particular routing path, or
   provide the data flow via a particular routing protocol.

20. The non-transitory computer-readable medium of claim 15, where the one or more instructions, when executed by the one or more processors, further cause the one or more processors to:

generate a service installation instruction to generate another virtual machine based on identifying that the measure of load associated with the virtual machine satisfies the threshold.

* * * * *